United States Patent
Cammi et al.

(10) Patent No.: US 10,245,538 B2
(45) Date of Patent: Apr. 2, 2019

(54) FILTERING PANEL FOR THE PASSIVE FILTERING OF AIR AND GASES

(71) Applicant: ANEMOTECH S.R.L., Casei Gerola (PV) (IT)

(72) Inventors: Gianmarco Cammi, Gragnano Trebbiense (IT); Marino Cavaion, Montebelluna (IT)

(73) Assignee: Anemotech S.R.L., Casei Gerola (PV) (IT)

( * ) Notice: Subject to any disclaimer, the term of this patent is extended or adjusted under 35 U.S.C. 154(b) by 0 days.

(21) Appl. No.: 14/906,499

(22) PCT Filed: Jul. 23, 2014

(86) PCT No.: PCT/IB2014/063350
§ 371 (c)(1),
(2) Date: Jan. 20, 2016

(87) PCT Pub. No.: WO2015/011662
PCT Pub. Date: Jan. 29, 2015

(65) Prior Publication Data
US 2016/0151729 A1    Jun. 2, 2016

(30) Foreign Application Priority Data

Jul. 24, 2013 (IT) ................ TV2013A0116

(51) Int. Cl.
| | |
|---|---|
| B01D 53/02 | (2006.01) |
| B01D 39/16 | (2006.01) |
| B01D 46/00 | (2006.01) |
| B01D 46/10 | (2006.01) |

(52) U.S. Cl.
CPC ..... B01D 39/1623 (2013.01); B01D 46/0036 (2013.01); B01D 46/10 (2013.01);
(Continued)

(58) Field of Classification Search
CPC .... B01D 2239/0407; B01D 2239/0414; B01D 2239/0442; B01D 2239/065;
(Continued)

(56) References Cited

U.S. PATENT DOCUMENTS

| 5,582,865 A | 12/1996 | Rezuke et al. |
| 2004/0011362 A1* | 1/2004 | Angadjivand ..... A41D 13/1146 128/206.13 |

(Continued)

FOREIGN PATENT DOCUMENTS

| EP | 1 468 732 A1 | 10/2004 |
| FR | 2 835 168 A1 | 8/2003 |

(Continued)

OTHER PUBLICATIONS

International Search Report dated Nov. 10, 2014, issued in PCT Application No. PCT/IB2014/063350, filed Jul. 23, 2014.

(Continued)

Primary Examiner — Christopher P Jones
(74) Attorney, Agent, or Firm — Workman Nydegger

(57) ABSTRACT

Filtering panel 100 for passively adsorbing micro particles such as atmospheric pollutants or the like, the panel having a first outer layer 10, a second outer layer 30 and an intermediate filtering layer 20 arranged between the first and second outer layers 10 and 30, the intermediate filtering layer 20 having a support structure impregnated with porous active carbons, where at least one of the outer layers 10 and 30 is optionally suitable for painting and/or coloring and/or printing, the panel 100 being therefore suitable for use for displaying information and/or directions, for example of an advertising or commercial nature, as well as an urban, extra-urban and domestic design element.

18 Claims, 2 Drawing Sheets

(52) U.S. Cl.
CPC ............... *B01D 2239/0407* (2013.01); *B01D 2239/0414* (2013.01); *B01D 2239/0442* (2013.01); *B01D 2239/065* (2013.01); *B01D 2239/1216* (2013.01); *B01D 2252/00* (2013.01)

(58) Field of Classification Search
CPC ........ B01D 2239/1216; B01D 2252/00; B01D 39/1623; B01D 46/0036; B01D 46/10
See application file for complete search history.

(56) References Cited

U.S. PATENT DOCUMENTS

| | | |
|---|---|---|
| 2004/0237790 A1 | 12/2004 | Von Blucher et al. |
| 2005/0211642 A1* | 9/2005 | Rokman ............ B01D 39/2055 210/749 |
| 2007/0207186 A1* | 9/2007 | Scanlon ................... A61F 2/07 424/424 |
| 2012/0172216 A1 | 7/2012 | Bohringer et al. |

FOREIGN PATENT DOCUMENTS

| | | |
|---|---|---|
| WO | 2003/073011 A2 | 9/2003 |
| WO | 2011/088185 A2 | 7/2011 |

OTHER PUBLICATIONS

Written Opinion dated Nov. 10, 2014, issued in PCT Application No. PCT/IB2014/063350, filed Jul. 23, 2014.
International Preliminary Report dated Sep. 28, 2015, issued in PCT Application No. PCT/IB2014/063350, filed Jul. 23, 2014.

\* cited by examiner

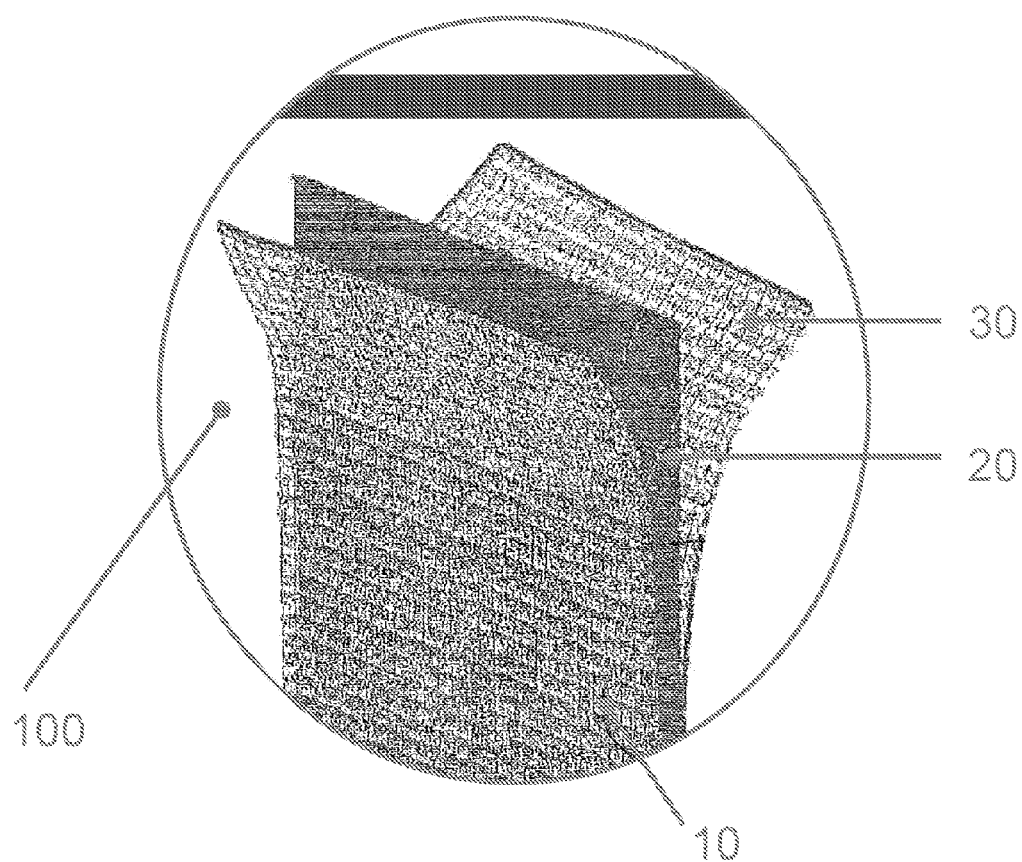

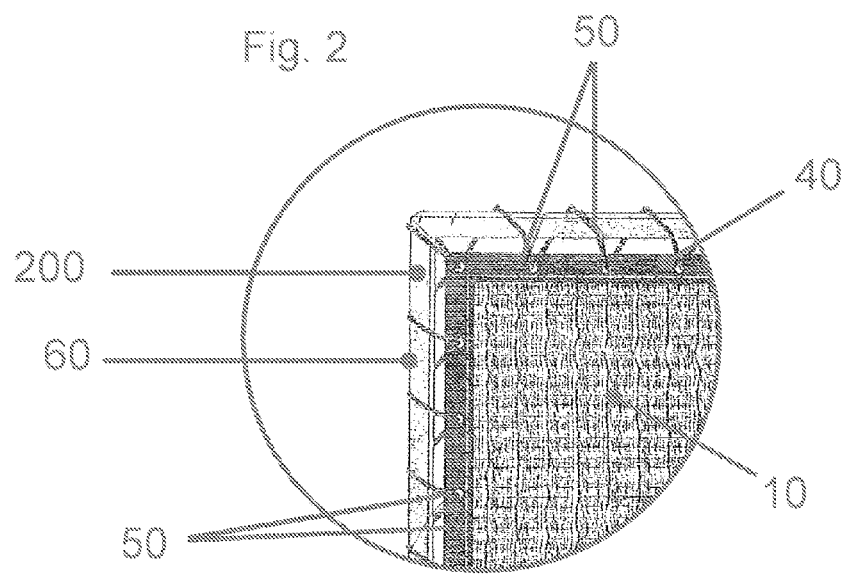
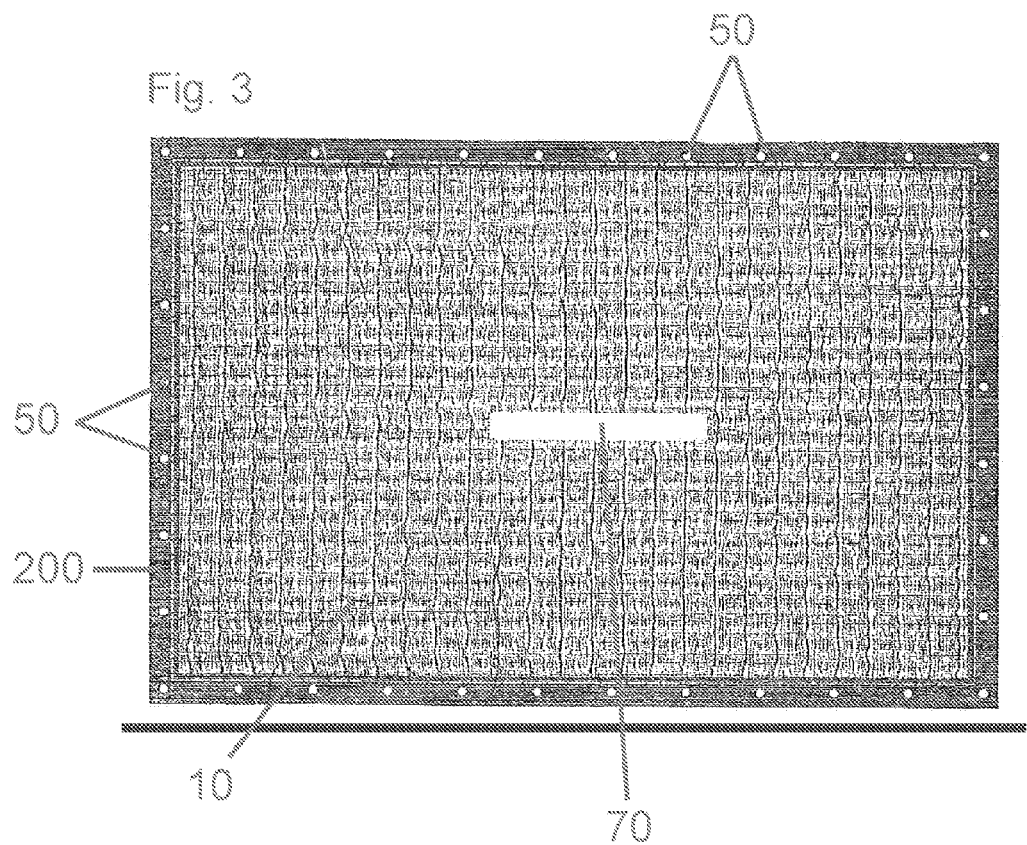

FILTERING PANEL FOR THE PASSIVE FILTERING OF AIR AND GASES

FIELD OF THE PRESENT INVENTION

The present invention relates to a solution for improving the quality of the air. In particular, the present invention relates to an innovative solution for efficient filtering of the air, which therefore allows the removal of pollutants such as dusts, particles and molecules or the like from the air. In detail, the present invention relates to a filtering panel suitable for installation both in closed environments and in open spaces.

PRIOR ART

The improvement of the quality of the air is a particularly important and pressing problem to which increasingly more attention has been paid in the recent past. Considerable efforts have been made in fact to improve the quality of the air both in working environments and in domestic environments, but also in open spaces such as urban or extra-urban environments and the like.

In particular, different solutions have been proposed for filtering the air, which solutions may be essentially divided into two categories. A first category is that comprising passive filtering of the air, while the second category is that involving active filtering. In detail, in active filtering systems the air is conveyed or propelled towards filtering systems by means of so-called forced conveying systems which may comprise for example fans or aspirators as well as pipes, valves or similar components. On the other hand, in passive filtering systems, the air comes into contact with the filtering systems, for example in the form of panels, by means of natural convection, the polluting substances being retained by the filtering systems and therefore removed from the air.

The main object of the present invention is in particular that of proposing an innovative solution in the sector of passive air filtering, which allows satisfactory results to be achieved in terms of efficient removal from the air of polluting substances such as fine dusts, micro dusts, molecules and/or organic and inorganic substances or similar components.

A further object of the present invention is also that of proposing a solution of the type specified above which is suitable for installation both in closed environments, such as working and/or domestic environments, and in open spaces, such as public spaces, gardens, parking areas, or the like.

Another object of the invention is that of providing a solution for the passive filtering of the air which is characterized by simple assembly and low costs.

Moreover, with regard to a further object of the present invention, the proposed solution must be characterized by a long duration (where "long duration" is understood as meaning a prolonged minimum efficient filtering period), low maintenance and versatility. In particular, the solution according to the present invention must be suitable for performing different functions in addition to that of filtering the air, such as functions associated with the commercial communication and/or urban and extra-urban design sector.

SUMMARY OF THE PRESENT INVENTION

The present invention is based on the general consideration that the results summarised above may be obtained by using active carbon as the main component for passive absorption of the polluting substances contained in the air, in particular both the solid suspended components such as fine dusts, micro dusts or the like, and molecules such as acid molecules or the like. A further consideration forming the basis of the present invention is that significant results may be achieved by suitably defining the dimensions of the active carbon pores and by using a predefined percentage amount of active carbons related in terms of weight to the overall weight of the support structure.

Another important consideration forming the basis of the present invention is that significant advantages in terms of duration may be obtained by means of a filtration system with a sandwich structure in which the layer of active carbons is combined with one or more layers (for example superimposed on a layer or arranged between two layers) where the "outer" layers are intended for the filtration of the macro particles, macro dusts or macro molecules contained in the air.

Finally, a further consideration forming the basis of the present invention relates to the design of the support structure which is conceived so as to simplify the assembly thereof and furthermore allows the structure to be used not just purely for filtration purposes, but for example also in connection with the commercial communication or advertising and/or urban design sector.

On the basis of the considerations illustrated above, the present invention, according to a first embodiment, relates to a filtering panel for the passive adsorption of micro particles such as atmospheric pollutants or the like, said panel comprising a first outer layer, a second outer layer and an intermediate filtering layer arranged between said first and second outer layers, said intermediate filtering layer comprising a support structure impregnated with porous active carbons, where the pore size of said active carbons is greater than 300 microns.

By defining the pore size of the carbons in accordance with the proposed innovative solution described here it is possible to disprove a widespread theory in the sector of active carbon filtering according to which the filtering efficiency is inversely proportional to the pore size. On the contrary, according to the present invention, the filtering efficiency improves if the pore size is suitably chosen since pores which are too small are rapidly saturated (drastically reducing the filtering efficiency), while on the other hand a larger size of the pores allows the substances absorbed, in particular the organic and acid molecules, to enter into contact with each other inside the pores (or more generally the cavities) of the active carbon and rapidly degrade by means of a natural biological process without promptly saturating said carbons, but on the contrary greatly prolonging their functional efficiency.

According to a further embodiment, the weight per square meter of said active carbons is equal to about 50% of the weight per square meter of the support structure; in this way, by using for example a support structure with a weight of 280 g per square meter, 140 g of active carbons per square meter will be used and, with a pore size as specified above, provide an adsorbing surface area of about 280,000 square meters with an air throughput of about 1700 liters per square meter per second.

According to a further constructional variant, the said support structure of said intermediate filtering layer is composed of heat-welded polyester fibres.

Advantageously, at least the first of said first and second outer layers is made of polyester or polypropylene. In this way it is possible to obtain prior filtration of the macro molecules and/or macro particles which otherwise would saturate and therefore clog the intermediate layer, in particular the active carbons.

Even more advantageously, said at least one outer layer is formed with a cellular structure; in this way the filtration of the macro molecules is improved. Moreover, the outer layer is suitable for undergoing hydrophobic treatments which improve the resistance thereof to atmospheric agents and prolong therefore their duration. Moreover, the layer is suitable for painting and/or printing, therefore allowing use of the panel for commercial, advertising and/or urban or environmental design purposes.

The comments made above in connection with the first of the outer layers are also applicable to the second layer which may, according to a further embodiment, consist of a polyester mesh suitable for colouring and/or printing so as to display street directions, commercial and/or advertising information and/or communications in general.

Advantageously and/or preferably, said first and second outer layers are fixed together along the respective perimeters so as to define an inner space, inside which the filtering layer is housed. In this way the assembly operations are simplified considerably, making the panel particularly advantageous from a cost-related point of view (especially when compared with active filtering techniques). Moreover, it is possible to use a single support structure (consisting of a single frame), with further significant economic advantages in terms of low assembly and installation costs.

According to a further embodiment, said first and second outer layers are fixed together in a non-permanent and removable manner, for example by means of Velcro (hook and loop) strips and/or automatic buttons and/or perimetral magnets applied to one of said first and second outer layers or to both of them. In this way one of the two outer layers or both of them may be rapidly and easily replaced, for example when they become saturated or also only in order to modify the commercial information or simply the graphics.

In the same way, said filtering layer may be fixed to one of said first and second outer layers or to both of them both in a non-permanent or removable manner, for example by means of Velcro (hook and loop) strips and/or automatic buttons and/or perimetral magnets, and in a permanent manner, for example by means of heat-welding, stitching and/or similar solutions.

Further embodiments of the present invention are specified in the claims.

BRIEF DESCRIPTION OF THE FIGURES

Further advantages, goals and features of the present invention will become clear below from the following description of embodiments of the present invention illustrated in the drawings wherein corresponding or equivalent characteristics or component parts of the present invention are identified by the same reference numbers.

In particular, in the figures:

FIG. 1 shows an exploded view of a filtering panel according to an embodiment of the present invention;

FIG. 2 shows a detail of the filtering panel according to an embodiment of the present invention;

FIG. 3 shows a side view of a filtering panel according to an embodiment of the present invention;

DETAILED DESCRIPTION OF THE PRESENT INVENTION

Although the present invention is described below with reference to its embodiments depicted in the drawings, the present invention is not limited to the embodiments described below and depicted in the drawings. On the contrary, the embodiments described below and depicted in the drawings clarify certain aspects of the present invention, the scope of which is defined by the claims.

The present invention may be used, in particular but not exclusively, in the sector of passive air filtering, in particular both in closed environments and in external spaces. For this reason, the present invention will be described below with particular reference to its use for passive air filtering. It should be noted, however, that the possible uses and/or applications of the present invention are not limited to the case of passive air filtering; on the contrary, the present invention may also be used advantageously in all those cases where passive filtering of a gaseous mixture is required, for example in order to remove from said gaseous mixture undesirable components such as micro dusts or fine dusts, micro and/or macro molecules or organic and/or inorganic substances, acid molecules or also odours or the like.

In FIG. 1, the filtering panel according to the embodiment of the present invention depicted therein is identified generally by means of the reference number 100 and comprises a main filtering layer 20 arranged between a first layer 10 and a second layer 30; below, for the sake of clarity, the main layer 20 will also be referred to as "intermediate layer" while the outer layers 10 and 30 will also be referred to as "first and second outer layers".

The main function of the filtering layer 20 is that of filtering passively the air for example in closed environments but also in open spaces, by removing from the air the polluting substances such as the micro or nano dusts or fine dusts, but also the organic and/or inorganic molecules or substances, acid molecules or similar components; for a more detailed description of the substances which may be removed from the air by means of the panel 100, in particular by means of the layer 20, reference is made to the following description.

For the sake of more completeness it is also pointed out that "passive" filtering has to be understood as meaning filtering obtained by means of the spontaneous passage of the air through the panel 100 (and therefore in particular through the layer 20) as a result of the natural movements and/or displacements of the air, for example due to convection.

For this purpose, the layer 20 comprises a support structure impregnated with porous active carbons. In particular, as a result of the studies forming the basis of the present invention it has been possible to establish that the efficiency of the layer 20 is dependent on the pore size of said active carbons, better results being obtained with holes having a size greater than 300 microns, in particular greater than 300 microns and not more than 500 microns. The dimensional range indicated refutes a widespread notion in the sector of filtering by means of porous active carbons according to which the efficiency increases with a reduction in the pore size. On the contrary, the studies forming the basis of the present invention have been able to show that, by means of the dimensional range indicated, it is possible to avoid rapid saturation of the carbons, the dimensions indicated allowing the molecules absorbed, in particular both the organic and acid molecules, to come into contact with each other inside the pores (or cavities) and rapidly degrade in accordance with a natural biological process and therefore without promptly saturating the carbons, but instead prolonging their functional efficiency.

Obviously, depending on the particular requirements and/or circumstances, the active carbons may be suitably treated in order to increase and/or modify the filtering efficiency depending on the components which are actually present in the air and/or in the atmosphere. For example, in connection with the present invention, the active carbons may be added or additioned of nano particles of copper oxides or other metal oxides in order to attract a greater quantity of the acid molecules. In the same way, the active carbons may also contain silver salts so as to exert a ionic action against bacteria, algae, fungi and similar components.

Moreover, the studies forming the basis of the present invention have been able to show even that the quantity per square meter of active carbons plays an important part or role in terms of filtration efficiency; in particular, by varying in percentage terms the weight per square meter of the active carbons in relation (with respect) to the weight per square meter of the support structure, it is possible to vary the exposed surface of the active carbons per square meter of layer. For example, by using a support structure with a weight of 280 g per square meter, with a weight per square meter of the active carbons equal to 140 g (50% of the weight per square meter of the support structure) the results in terms of filtering efficiency and delayed saturation of the layer 20 are improved significantly. In fact, in this case, the exposed surface area of the active carbons may reach a value of 280,000 square meters per square meter of layer 20.

Obviously, depending on the requirements and/or circumstances, the layer 20 (in particular the active carbons) may undergo specific treatments; for example, the scope of the present invention includes an active carbon treatment using titanium dioxide, silver nitrate or similar substances as well as anti-bacterial, hydrophobic and/or fireproofing treatments.

The substances in the air able to be captured by means of the panel according to the present invention certainly include nitrogen oxides, sulphur oxides, ozone, volatile organic compounds (VOC), sulphates and ammonium nitrates, carbon monoxide, aromatic polycyclic hydrocarbons, pesticides, environmental tobacco smoke as well as obviously nano dusts and fine dusts, organic and inorganic molecules in general and acid molecules.

Different embodiments of the support structure of the filtering layer 20 are included within the scope of the present invention; for example the support structure may consist of an assembly of heat-welded polyester fibres.

As regards the two layers 10 and 30 it is pointed out first of all that, although the embodiment shown in FIG. 1 involves the use of two layers, one for each side of the intermediate layer 20, the scope of the present invention also includes embodiments which envisage the use of both a single outer layer and two outer layers (as shown in FIG. 1) which may be different from each other. In the following, therefore, a detailed description of the possible embodiments of one of the two layers will therefore be provided, said embodiments also being possible for the second layer.

The characteristic features of the outer layer 10 may vary depending on the objects to be achieved, in particular depending on the functions which the layer itself must perform. For example, in the case of an outer layer which performs simply support functions, it may be made of any breathable material such as synthetic or natural fabric (for example cotton). However, other materials may be preferable in the case where the layer 10 is intended for other purposes, said possible functions of the layer 10 including prior filtering of the macroscopic components of the air (so as to avoid rapid saturation of the layer 20) as well as a function of protecting the layer 20, for example from atmospheric agents.

In this connection the outer layers 10 and 30 (one or both of them) may consist of polypropylene or polyester mesh fabrics, for example made on conventional looms with a cellular structure or on Raschel looms with a three-dimensional structure, so as to allow a high throughput of the air and at the same time trap volatile macro particles and water droplets. Alternatively, the outer layers 10 and 30 (one or both of them) may be formed by an "undemeshable" three-dimensional mesh of the polyester type which, in addition to performing the functions described above, is suitable for colouring and/or printing, therefore allowing the use of the panel according to the present invention also for commercial purposes such as advertising communications or the like, or also as a road sign, urban design element or the like.

In particular, in the case of open spaces (outdoors), by suitably choosing the materials for the outer layers 10 and 30 (one or both of them) the panel 100 may be used effectively in the sector of advertising and/or information hoardings, as a covering for the facades of commercial buildings or structures (and therefore both as an advertising and/or information hoarding and as a covering for example providing shade), as a covering and/or masking element for building-site scaffolding, as an element for fencing off areas such as worksites, parking areas or the like, as an external awning, or the like.

In the same way, in the case of closed or confined environments (indoors), the panel 100 may for example be used as an advertising and/or information billboard for example inside or outside of sports centres and/or trade fair centres as well as inside cultural centres or establishments (schools, universities, museums, cultural centres, etc.), as well as inside domestic or working environments such as houses, offices, for example mounted on the walls with personalized graphics, as an internal screening, as well as a decorative element or covering element for walls and/or fixtures (in particular doors and windows).

The present invention also includes different treatments of one or both the outer layers 10 and 30 such as a hydrophobic or hydrorepellent treatment for protecting the inner layer 21 from atmospheric agents, in particular from rain and moisture. Finally it is possible to mention also, from among all the other possible treatments, anti-bacterial treatment, fireproofing treatment (for reducing the risk of fire), etc.

Below, with particular reference to FIGS. 2 and 3, the more strictly structural and/or aesthetic characteristics of the panel according to the present invention will be described; in FIGS. 2 and 3, those features and/or component parts of the panel according to the present invention already described above with reference to FIG. 1 are identified by the same reference numbers.

In general, the present invention includes different methods of assembling the panel 100, in particular different methods for fixing together the various layers from which the panel 100 may be made.

In the case where a single outer panel 10 (or also 30) is provided, the filtering layer 20 and the outer layer 10 may be fixed both definitively and permanently and in a non-definitive manner, whereby "definitive fixing" is understood as meaning a fixing system where breakage or damaging of the layers (one or both or parts of them) occurs as a direct consequence of separation of layers, while on the other hand "non-definitive or non-permanent fixing" is understood as meaning a fixing system which allows separation of the layers without damaging them (one or both or parts of them).

For example, the definitive fixing methods include stitching together of the layers 10 and 20, for example along the respective perimeters and/or parts inside the perimeters, or heat-welding or also stapling or gluing or also fixing by means of studs for example made of metal or similar materials.

On the other hand, the non-definitive fixing methods may include fixing by means of Velcro strips fixed to the layers along corresponding or superimposed parts, for example by means of gluing, stitching, heat-welding, etc.

According to any one of the methods cited above a panel formed by two superimposed layers, each of which, if fixed in a non-definitive manner, may be removed and if necessary replaced, is therefore obtained. For example, the filtering panel 20 may be removed or replaced once saturated or in a deteriorated condition; in the same way the outer layer 10 may be replaced if it is required for example to modify the commercial message or also the graphics or also when the layer has become saturated or has deteriorated.

In the case of a panel 100 consisting of three superimposed layers as shown in FIG. 1, namely a main, intermediate, filtering layer 20 and two outer layers 10 and 30, the methods of fixing the layers together are essentially the same.

In this case, however, it is possible to avoid fixing the inner layer 20 to one of both the outer layers 10 and 30 which may be still be fixed together both definitively (stitched, heat-welded, glued, etc.) and in a non-definitive manner (for example by means of strips of Velcro or similar adhesive materials). In this case, however, as a result of fixing together of the outer layers 10 and 30 along the respective perimeters and using the methods described hitherto, the inner layer 20 may be simply housed inside the inner space defined by the outer layers 10 and 30 without the need to fix the inner layer 20 to one or both the outer layers 10 and 30. Obviously, in the case where unwanted displacements or movements of the inner layer 20 are to be avoided, the same inner layer 20 may also be fixed to one of the outer layers 10 and 30, in particular both definitively and in a non-definitive manner, using one or more of the methods described above.

As an alternative or in addition to the methods for fixing the layers 10, 20 and 30 above, a perimetral or external edge 40, for example made of PVC, may be provided, said edge keeping the layers 10, 20 and 30 in a fixed and predefined position. For example, the edge 40 may be fixed (stitched, heat-welded, glued, etc.) to one of the layers 10, 20, 30 or also to two of them or also to all three layers, whereby the layers which are not fixed to the edge 40 may be fixed to each other using the methods described hitherto, namely both in a removable or non-definitive manner and definitively. By way of a non-limiting example, in the case of a panel composed of the two layers 10 and 20, the edge 40 may be fixed to one of them, while the layers may be fixed to each other by means of stitching, heat-welding, gluing, stapling or also by means of Velcro strips, as described above. Again by way of a non-limiting example, in the case of a panel composed of two outer layers 10 and 30 and an inner filtering layer 20, the edge 40 may be fixed to the outer layers 10 and 30, with the outer layer which may be simply housed between the two layers 10 and 30.

The edge 40 may also be provided with through-eyelets for example made of metal, which allow fixing of the panel, for example as shown by means of a simple cord 60, to a support frame 200. It should be noted in particular that the fixing together of the layers of the panel in the ways described, optionally together with use of the outer or peripheral edge 40, allows a single support frame 200 to be used and therefore the overall dimensions of the panel, as well as the production costs, to be reduced significantly.

FIG. 3 shows a panel 100 according to an embodiment of the present invention with graphics 70 on the outer layer 10.

Finally, among the functions of the panel according to the present invention one function which should be mentioned is that of breaking down odours, this being particularly useful when used in closed environments. In fact, carbon has an important intrinsic characteristic of eliminating odours, said odours which may be eliminated including organic odours produced by the human body, kitchen odours, odours of essential oils, food odours, musty odours, odours from sewers as well as odours from bathrooms and toilets. The panel is therefore suitable for many uses both in the industrial and private sectors.

It has therefore been demonstrated by means of the detailed description of the embodiments of the panel according to the present invention illustrated in the drawings that the panel according to the present invention is able to achieve the predefined objects.

In particular, the panel according to the present invention ensures an improved efficiency in terms of absorption of the polluting components present in the air, in particular of the micro dusts or fine dusts as well as the organic and inorganic molecules or substances both in closed environments and in open spaces.

Moreover, the panel according to the present invention may be used for publicising information, for example of a commercial or advertising nature, or also for displaying street information or the like, as well as an urban design element, for example for covering or improving the appearance of areas which are degraded or in which work (site-work or the like) is in progress, as well as a covering for facades, pergolas, roofs or similar surfaces. Finally, the panel according to the present invention may be applied simply to pre-existing structures, for example to fixtures in internal environments or also in addition to or as an alternative to decorative elements such as pictures or the like.

Although the essential aspects of the present invention have been clarified by means of the above description of the embodiments shown in the drawings, the present invention is not limited to the particular embodiments shown and described; on the contrary, further variants of the embodiments described fall within the scope of the present invention. The object of the present invention is therefore defined by the claims.

The invention claimed is:

1. A filtering panel configured for the passive adsorption, by natural non-forced convection, of micro particles such as atmospheric pollutants or the like, said panel comprising a first outer layer, a second outer layer and an intermediate filtering layer arranged between said first and second outer layers, said intermediate filtering layer comprising a support structure impregnated with porous active carbons, wherein said support structure of said intermediate filtering layer is composed of heat-welded polyester fibres, wherein a weight per square meter of said active carbons is equal to 50% of a weight per square meter of said support structure, and wherein said support structure has a weight of 280 g. per square meter, and an exposed surface area of said active carbons has a value up to 280,000 square meters per square meter of said intermediate filtering layer.

2. The filtering panel according to claim 1, wherein at least the first of said first and second outer layers is made of polyester or polypropylene.

3. The filtering panel according to claim 2, wherein said at least one outer layer is made with a cellular structure.

4. The filtering panel according to claim 2, wherein said second outer layer is formed by a polyester mesh suitable for colouring and/or printing so as to display street directions, commercial information and/or advertising information and/or communications in general.

5. The filtering panel according to claim 1, wherein said first and second outer layers are fixed together along respective perimeters so as to define an internal space and in that said intermediate filtering layer is freely housed inside said internal space without being fixed to the first outer layer or the second outer layer.

6. The filtering panel according to claim 5, wherein said first and second outer layers are fixed together in a permanent and definitive manner.

7. The filtering panel according to claim 6 wherein said first and second outer layers are fixed together by means of stitching or heat-welding.

8. The filtering panel according to claim 5, wherein said first and second outer layers are fixed together in a non-permanent or removable manner.

9. The filtering panel according to claim 8, wherein said first and second outer layers are fixed together by hook and loop strips applied to said first and second outer layers.

10. The filtering panel according to claim 9, wherein said hook and loop strips are applied by stitching or heat-welding.

11. The filtering panel according to claim 5, wherein said intermediate filtering layer is fixed to one of said first and second outer layers in a permanent and definitive manner by means of stitching or heat-welding.

12. The filtering panel according to claim 5, wherein said intermediate filtering layer is fixed to one of said first and second outer layers in a non-permanent or removable manner by hook and loop strips.

13. The filtering panel according to claim 1, wherein said active carbons are treated using titanium dioxide, silver nitrate or using anti-bacterial, hydrophobic and/or fireproofing treatments.

14. The filtering panel according to claim 1, wherein the first outer layer, the second outer layer and the intermediate filtering layer combine to form a flat and planar display panel, graphics being formed on one of the first outer layer or the second outer layer.

15. The filtering panel according to claim 14, wherein graphics comprise street directions, commercial information or advertising information.

16. A panel assembly comprising:
the filtering panel as recited in claim 1, wherein the filtering panel has an outer perimeter edge; and
a support frame at least partially encircling an opening, the filtering panel being flat and planar and disposed within the opening of the support frame, the perimeter edge of the filtering panel being secured to the support frame.

17. The panel assembly as recited in claim 16, wherein the filtering panel and the support frame are both rectangular.

18. The panel assembly as recited in claim 1, wherein at least a portion of the filtering layer is not secured to the first outer layer or the second outer layer.

* * * * *